July 7, 1970  P. L. SULLIVAN  3,519,285
COASTER TYPE VEHICLE

Filed Jan. 2, 1968  4 Sheets-Sheet 1

INVENTOR
PAUL L. SULLIVAN
BY
Schmieding & Fultz
ATTORNEYS

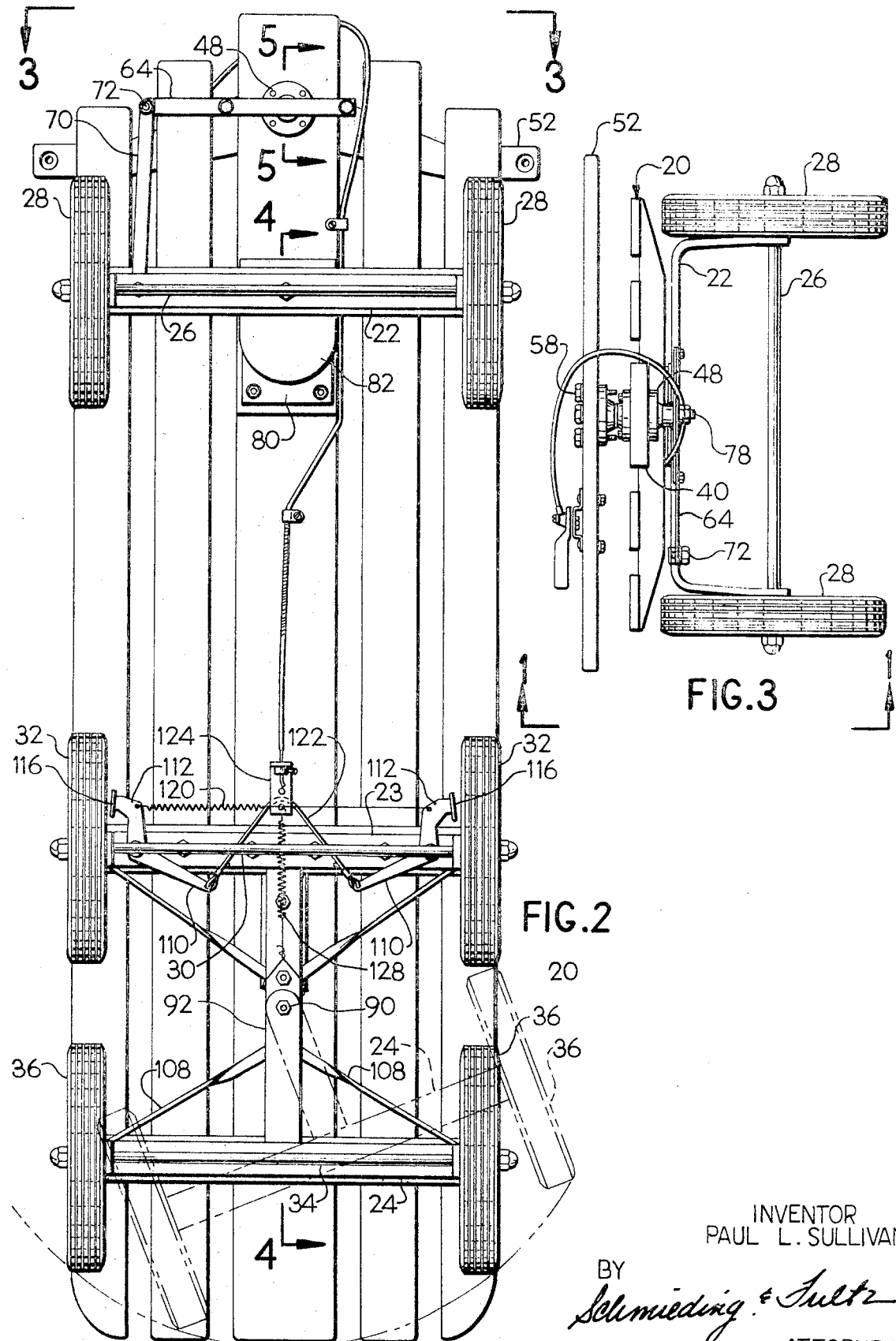

July 7, 1970          P. L. SULLIVAN          3,519,285

COASTER TYPE VEHICLE

Filed Jan. 2, 1968          4 Sheets-Sheet 4

INVENTOR
PAUL L. SULLIVAN

BY
*Schmieding & Fultz*
ATTORNEYS

United States Patent Office 3,519,285
Patented July 7, 1970

3,519,285
COASTER TYPE VEHICLE
Paul L. Sullivan, 527 Harrison Ave.,
Lancaster, Ohio 43130
Filed Jan. 2, 1968, Ser. No. 695,146
Int. Cl. B62b 3/00
U.S. Cl. 280—87.01                      4 Claims

ABSTRACT OF THE DISCLOSURE

A coaster type vehicle that includes a steering mechanism adapted to apply leverage steering control by an operator lying in a prone position, said vehicle being further characterized by a multiple axle suspension system providing stability in cornering and smoothness of ride qualities, and a simple brake mechanism adapted for the application of equalized braking by an operator lying on the vehicle in a prone position.

---

This invention relates to coaster type vehicles, and more particularly to a device of this type which is particularly adapted to be operated by a passenger lying in a prone position.

In general, the vehicle of the present invention is adapted for coasting down hills, in the same manner as a sled and as one aspect of the present invention the vehicle includes an improved steering mechanism adapted to provide the operator with safe, positive directional control, even when the vehicle is moving at relatively high speeds.

As another aspect of the present invention, the coaster type vehicle is provided with a novel running gear arrangement wherein longitudinally spaced pairs of front, intermediate, and rear wheels are arranged in a novel manner to permit the vehicle to negotiate sharper turns without upsetting.

As another aspect of the present invention, the above mentioned novel arrangement of the running gear provides a high degree of frictional contact with the road surface thereby eliminating tendency for the vehicle to skid.

As another aspect of the present invention, the above mentioned novel arrangement of the running gear results in a smoother more comfortable ride due to the provision of additional points of wheel contact with the road surface.

As another aspect of the present invention, the vehicle is provided with a novel brake mechanism which can be effectively actuated by the operator from a brake lever mounted on the tiller type steering lever while the operator is lying in a prone position and the frame of the vehicle.

As another aspect of the present invention, the vehicle includes a novel brake system which is arranged in a simple manner to provide substantially equal braking effects to both a right and left wheel braking surface.

As another aspect of the present invention, the vehicle is provided with a novel steering mechanism which in a simple manner provides leverage in directionally controlling supporting wheels from a simple tiller type steering lever that can be manipulated by the operator while lying in a prone position on the vehicle frame.

It is, therefore, an object of the present invention to provide an improved coaster type vehicle which includes a novel steering arrangement that permits steering leverage and positive control with a simple tiller type steering lever.

It is another object of the present invention to provide an improved coaster type vehicle which includes a novel running gear arrangement that increases cornering capabilities, provides increased frictional contact with the road surface, and which, in addition, provides a smoother ride, particularly when the vehicle is traveling over an uneven road surface.

Further objects and advantages of the present invention will be apparent from the following description, reference being had to the accompanying drawings wherein a preferred form of embodiment of the invention is clearly shown.

In the drawings:

FIG. 2 is a bottom elevational view of the vehicle of FIG. 1;

FIG. 3 is a front elevational view of the vehicle of the preceding figures;

Referring in detail to the drawings, the coaster type vehicle comprises a frame indicated generally at 20, a front wheel support 22, an intermediate wheel support 23, and a rear wheel support 24.

Figure 1:
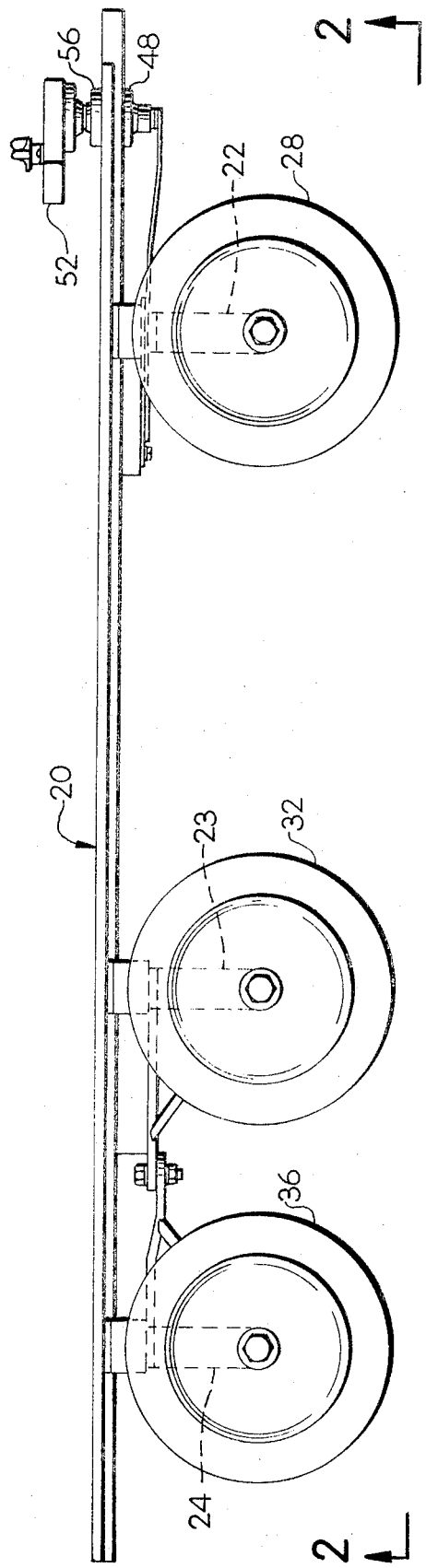
FIG. 1 is a side elevational view of a coaster type vehicle constructed in accordance with the present invention.

As is best seen in FIGS. 1 and 2, front wheel support 22 carries a front axle 26 on which is mounted front wheels 28.

Similarly, intermediate wheel support 23 carries intermediate axle 30 on which is mounted intermediate wheels 32 and rear wheel support 24 includes a rear axle 34 on which is mounted rear wheels 36.

Figure 5:
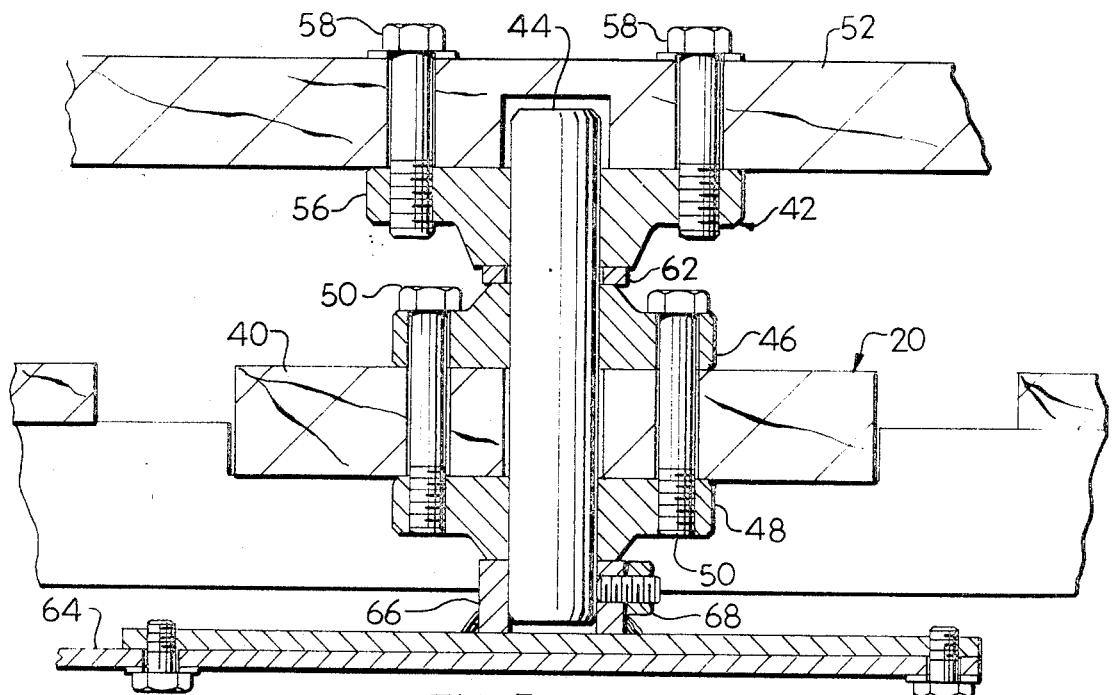
FIG. 5 is a side sectional view showing a portion of the steering mechanism of the vehicle of the preceding figures, the section being taken along the lines 5—5 of FIG. 2.

As seen in FIG. 3, frame means 20 includes a main central frame member 40 on which is mounted a front steering pivot means indicated generally at 42 as best seen in FIG. 5. Such steering mechanism includes pivot pin 44 mounted for rotation in bearings 46 and 48 which are mounted on central frame member 40 by studs 50.

With continued reference to FIG. 5 the upper end of pivot shaft 44 carries a steering lever or tiller bar 52, the upper end of said shaft being keyed to steering lever 52 at a flange 56 attached to the lever by studs 58.

As seen in FIG. 5, a bearing washer 62 is interposed between flange 56 and bearing member 46.

Figure 6:
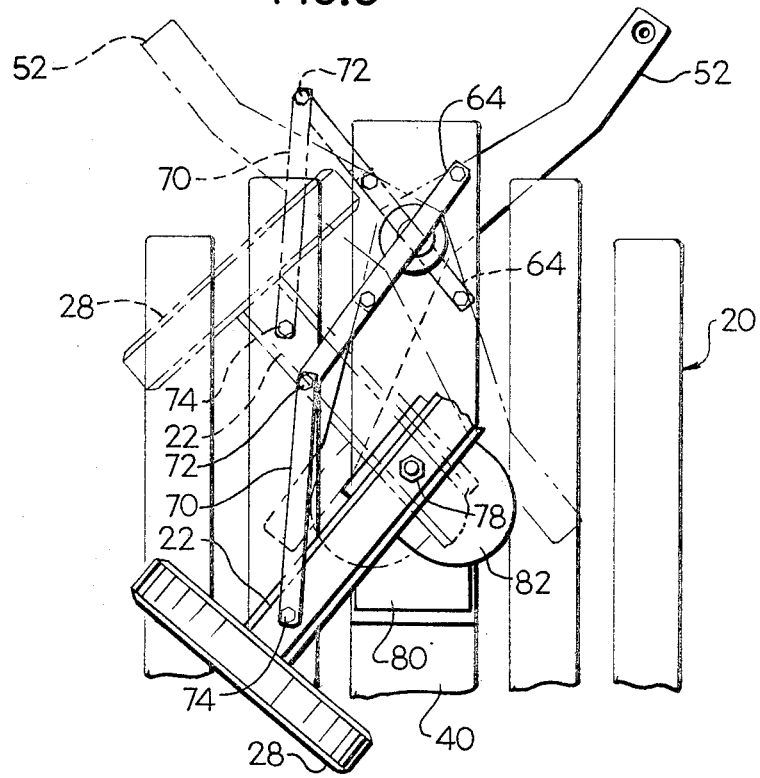
FIG. 6 is a partial bottom elevational view of a steering linkage comprising a portion of the vehicle of the preceding figures.

With continued reference to FIGS. 2, 5, and 6, a steering bar 64 is mounted on the lower end of pivot shaft 44 at a boss 66, a set screw 68, disposed in threaded hole in boss 66 being used to attach steering bar 64 to the lower end of the shaft.

As is best seen in FIGS. 2, 3 and 6, the steering linkage further includes a link 70 having one end connected to an end of steering bar 64 at a link pivot pin 72 and the other end connected to front wheel support 22 at a second link pivot pin 74.

Figure 4:
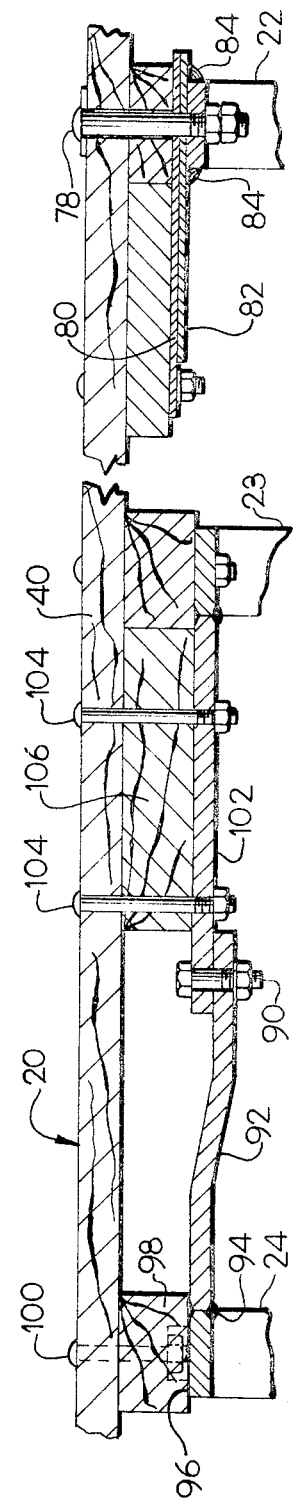
FIG. 4 is a partial side sectional view illustrating a portion of the running gear and steering mechanism of the vehicle of the preceding figures, the section being taken along the line 4—4 of FIG. 2.

Referring next to FIGS. 4 and 6, front wheel support 22 is pivoted to central frame member 40 at a pivot pin 78. An upper plate 80 is mounted to the underside of frame 20 and a lower plate 82 is slideably disposed under upper plate 80 and secured to front wheel support 22 at a welded junction 84.

The purpose of the bearing plates 80 and 82 is to reinforce front wheel support 22 against road imposed impacts.

Reference is next made to FIGS. 1, 2, and 4 which most clearly illustrate the novel running gear arrangement of the vehicle of the present invention. From these views it will be seen that the previously mentioned rear wheels 36 and rear wheel support 24 are attached to a rear wheel pivot pin 90 by a pivot bar 92. Pivot bar 92 is secured to rear wheel support 24 at a welded junction 94 and an upper surface 96 of rear wheel support 24 underlies and slideably engages a transverse bearing block 98 secured to the underside of frame 20.

As is best seen in FIG. 4, the front end of pivot bar 92 is pivotally secured to a mount 102 by a plurality of bolts 104 which extend through a spacer block 106.

With reference to FIG. 2, it will be noted that rear wheel support 24 is reinforced by braces 108 connected between pivot bar 92 and rear wheel support 24.

Figure 7:
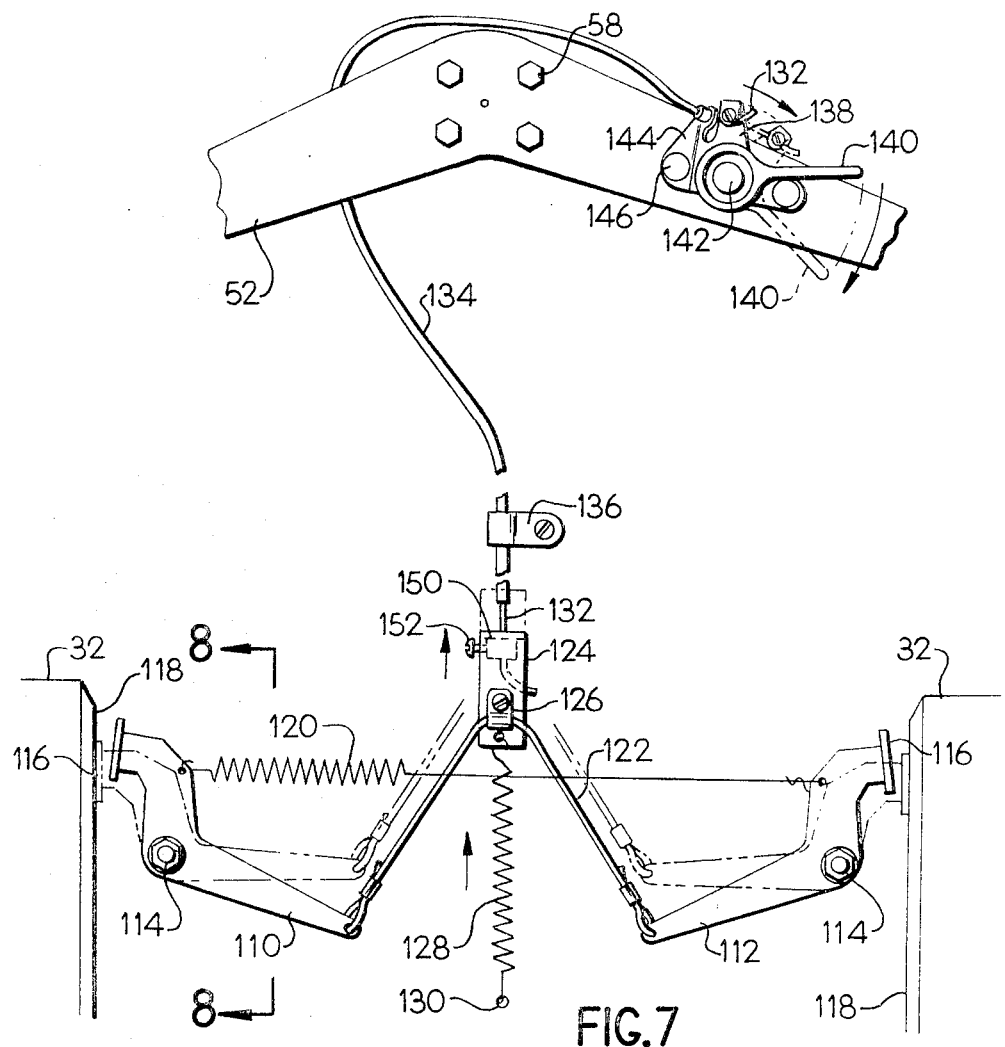
FIG. 7 is a partial top elevational view of a brake mechanism comprising a portion of the vehicle of the preceding figures.
Figure 8:
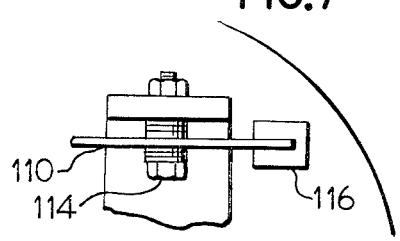
FIG. 8 is a partial side sectional view of the brake mechanism of FIG. 7, the section being taken along the line 8—8 of FIG. 7.

For purposes of describing the brake system incorporated in the vehicle of the present invention, reference is next made to FIGS. 2, 7, and 8 from which it will be seen that frictional braking action is applied to intermediate wheels 32 by pivoted brake levers 110 and 112 mounted to the underside of frame 20 by brake pivot pins 114.

The outer ends of brake levers 112 include shoe portions 116 which frictionally engage side surfaces 118 of intermediate wheels 32 as is best seen in FIG. 7.

A tension spring 120 is connected between the outer arms of brake levers 110 and 112 so as to constantly bias the brake levers away from engagement with side surfaces 118 on the wheels.

With continued reference to FIG. 7, a flexible member 122 is connected between the inner ends of brake levers 110 and 112 and the center of flexible member 122 is secured to a slide 124 by a bracket 126, said slide being constantly urged rearwardly by a tension spring 128 having its rear end connected to frame 20 at a spring connection 130.

With continued reference to FIG. 7, slide 24 is actuated by a cable that extends through a sheath 134, the end of said sheath being secured to the underside of frame 20 by a clamp bracket 136.

The forward end of cable 132 is attached to an arm 138 of a manually actuated lever 140 which is pivotally mounted to a steering handle 52 at a pivot pin 142, said pin being carried by a bracket 144 attached to handle 52 by studs 146.

It should be mentioned that the rear end of brake cable 132 is secured to a flange 150 on slide 124 by a set screw 152.

It will now be understood that when brake lever 14 is actuated to the rear, as shown in dotted delineation in FIG. 7, brake cable 132 moves slide 124 forwardly which equally tensions the two ends of flexible member 142 thereby pivoting brake levers 110 and 112 with substantially equal pressure against the braking surface 118.

I claim:

1. A coaster type vehicle comprising, in combination, frame means; a rear wheel support means pivotally mounted to said frame means at a rear wheel support pivot; rear wheels on said rear wheel support means; intermediate wheel support means mounted to said frame means forwardly of said rear wheel support means; intermediate wheels on said intermediate wheel support means; front wheel support means pivotally mounted to said frame means forwardly of said intermediate wheel support means; front wheels forwardly of said intermediate wheel support means; front wheels on said front wheel support means; and steering means including a manually actuated steering lever pivotally mounted to said frame means and operatively connected to said front wheel support means.

2. The coaster type vehicle defined in claim 1 wherein said steering means includes a steering shaft extending vertically through said frame means at a second steering pivot means and including an upper end and a lower end, said manually actuated steering lever being mounted on said upper end of said steering shaft; a steering arm mounted on said lower end of said steering shaft; and a link including a first pivotal connection with said steering arm and a second pivotal connection with said front wheel support means.

3. A coaster type vehicle comprising, in combination, frame means; a rear wheel support means pivotally mounted to said frame means at a rear wheel support pivot; rear wheels on said rear wheel support means; intermediate wheel support means mounted to said frame means forwardly of said rear wheel support means; intermediate wheels on said intermediate wheel support means; front wheel support means pivotally mounted to said frame means forwardly of said intermediate wheel support means; front wheels on said front wheel support means; steering means including a manually actuated steering lever pivotally mounted to said frame means and operatively connected to said front wheel support means; brake means comprising a brake arm pivotally mounted to said frame means and including a brake shoe frictionally engaging one of said rear wheels; a manually actuated brake lever mounted on the forward portion of said vehicle; and means connecting said brake arm with said brake lever.

4. The coaster type vehicle defined in claim 3 wherein said steering means includes a steering shaft extending vertically through said frame means at a second steering pivot means and including an upper end and a lower end, said manually actuated steering lever being mounted on said upper end of said steering shaft; a steering arm mounted on said lower end of said steering shaft; and a link including a first pivotal connection with said steering arm and a second pivotal connection with said front wheel support means.

References Cited

UNITED STATES PATENTS

| 1,572,789 | 2/1926 | Griffin | 280—16 |
| 1,625,224 | 4/1927 | Pearl | 280—87.01 |
| 1,858,858 | 5/1932 | Janas | 280—87.01 |
| 2,157,461 | 5/1939 | Robinson | 280—8 |
| 2,743,112 | 4/1956 | Lambert | 280—87.01 X |

LEO FRIAGLIA, Primary Examiner

U.S. Cl. X.R.

188—19, 20